(12) United States Patent
Fiebrich-Kandler et al.

(10) Patent No.: US 9,911,453 B2
(45) Date of Patent: Mar. 6, 2018

(54) AUTOMATED JUST A BUNCH OF DISKS MANAGEMENT (71) Applicant: International Business Machines Corporation, Armonk, NY (US)

(72) Inventors: Uwe Fiebrich-Kandler, Friesenheim (DE); Frank Krick, Ockenheim (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/862,364

(22) Filed: Sep. 23, 2015

(65) Prior Publication Data
US 2017/0084304 A1 Mar. 23, 2017

(51) Int. Cl.
*G06F 7/00* (2006.01)
*G11B 17/22* (2006.01)
*G11B 33/12* (2006.01)

(52) U.S. Cl.
CPC .......... *G11B 17/225* (2013.01); *G11B 33/125* (2013.01)

(58) Field of Classification Search
None
See application file for complete search history.

(56) References Cited

U.S. PATENT DOCUMENTS

| 6,600,967 | B2 | 7/2003 | Milligan et al. |
| 7,434,097 | B2 | 10/2008 | Guha et al. |
| 7,644,304 | B2 | 1/2010 | Kotzur et al. |
| 9,411,764 | B2 | 8/2016 | Andrews et al. |
| 9,705,987 | B2 * | 7/2017 | Hsieh .................. H04L 67/1097 |
| 2009/0262444 | A1 * | 10/2009 | Polyakov ............ G11B 17/225 360/31 |
| 2010/0241803 | A1 * | 9/2010 | Starr .................... G11B 27/002 711/115 |
| 2013/0229766 | A1 * | 9/2013 | Williams .................. G06F 1/16 361/679.33 |
| 2016/0218922 | A1 | 7/2016 | Jain et al. |

FOREIGN PATENT DOCUMENTS

CN 102999399 A 3/2013

OTHER PUBLICATIONS

Ruel et al., "Oracle Automatic Storage Management", Oracle 12c for Dummies, Printed Jul. 13, 2015, pp. 1-3, <http://www.dummies.com/how-to/content/oracle-automatic-storage-management.html>.

* cited by examiner

*Primary Examiner* — Yolanda Cumbess
(74) *Attorney, Agent, or Firm* — Alexa L. Ashworth; Brian M. Restauro (57) ABSTRACT

Embodiments of the present invention provide a drive storage system, method, and computer program process for automatically replacing drives. In one embodiment, one or more computer processors receive a request for a new drive. One or more computer processors direct an exchange robot to obtain the new drive from a drive repository and to proceed to a location of a used drive. One or more computer processors then direct the exchange robot to remove the used drive from the location and to insert the new drive into the location of the used drive.

18 Claims, 5 Drawing Sheets

AUTOMATED JUST A BUNCH OF DISKS MANAGEMENT

BACKGROUND OF THE INVENTION

The present invention relates generally to the field of data storage, and more particularly to automated management of Just a Bunch of Disks (JBOD) storage systems.

JBOD stands for Just a Bunch of Disks and typically is defined as a collection of disk drives contained in a single drive enclosure, though JBOD could just as easily refer to a stack of external single drives connected to a computer. Regardless of the configuration, each of the drives in a JBOD arrangement can be accessed from the host computer as a separate drive (contrasted to RAID, which treats a collection of drives as a single storage unit). Depending on the design and architecture of the JBOD storage enclosure, there may be a connector for each drive in the enclosure, unless the JBOD enclosure contains an internal hub.

SUMMARY

Embodiments of the present invention provide a drive storage system, method, and computer program process for automatically replacing drives. In one embodiment, one or more computer processors receive a request for a new drive. One or more computer processors direct an exchange robot to obtain the new drive from a drive repository and to proceed to a location of a used drive. One or more computer processors then direct the exchange robot to remove the used drive from the location and to insert the new drive into the location of the used drive.

In another embodiment, a drive storage system is provided, comprising a plurality of just a bunch of disks (JBOD), wherein each JBOD includes a plurality of drives; a storage management controller, wherein said storage management controller is configured to manage said plurality of drives; and a robot system, wherein said robot system is configured to move in an x-, y-, and z-direction.

DETAILED DESCRIPTION

As data environments grow, the number of Hard Disk Drives (HDDs) (or Solid-State Drives (SSDs)) managed within a JBOD will grow as well. This increase in HDDs leads to an increase in physical HDD failure. Presently, for example, an IBM® Scale Out Network Attached Storage (SONAS) system can manage 15 PB of data, which translates into a JBOD of 5,000×3-TB HDDs. If a physical HDD failure rate of 2% per year is presumed, 100 HDDs will fail per year (or 2 HDDs per week). Presently, defective HDDs are replaced manually by a trained service person, who is usually not located on site, but rather must travel to the data center. Physical HDD failure creates a risk of data loss and must be replaced in a timely manner. Sometimes it is necessary to proactively replace multiple working HDDs at a time because of identified vintage issues. This is very time consuming as each disk must be rebuilt. Embodiments of the present invention provide a system and method for an automated management of JBOD storage solution that automatically replaces HDDs by adding a mechanism to multiple storage racks, which can open and close JBOD drawers, and exchange defective HDDs for new HDDs. It should be appreciated that the present invention is not limited to the replacement of HDDs but is also compatible with the replacement of other drive types such as SDDs.

Figure 1:
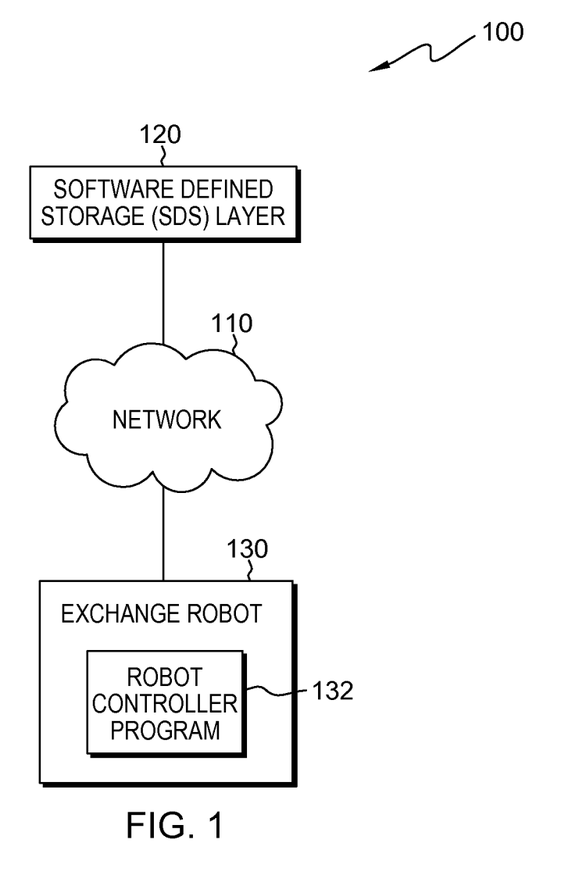
FIG. 1 is a functional block diagram illustrating an environment, in accordance with an embodiment of the present invention.

The present invention will now be described in detail with reference to the figures. FIG. 1 is a functional block diagram illustrating an environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, environment 100 includes software defined storage (SDS) layer 120 connected to exchange robot 130 over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between SDS layer 120 and exchange robot 130.

SDS layer 120 is computer data storage software to manage policy-based provisioning and management of data storage independent of hardware. SDS storage definitions typically include a form of storage virtualization to separate the storage hardware from the software that manages the storage infrastructure. The software enabling a software-defined storage environment may also provide policy management for feature options such as deduplication, replication, thin provisioning, snapshots, and backup. SDS layer 120 comprises a GNR: General Parallel File System (GPFS™) Native Redundant Array of independent disks (RAID). GNR is a software implementation of storage RAID technologies within GPFS, which eliminates the need of a hardware RAID controller and generates dynamic software RAID on a JBOD system. SDS layer 120 is capable of detecting that a HDD is defective. SDS layer 120 communicates with exchange robot 130 information regarding the type and part number of the defective HDD. In this exemplary embodiment, there is one SDS layer 120 in environment 100. However, it should be appreciated that there may be a plurality of SDS layers in environment 100.

Figure 2:
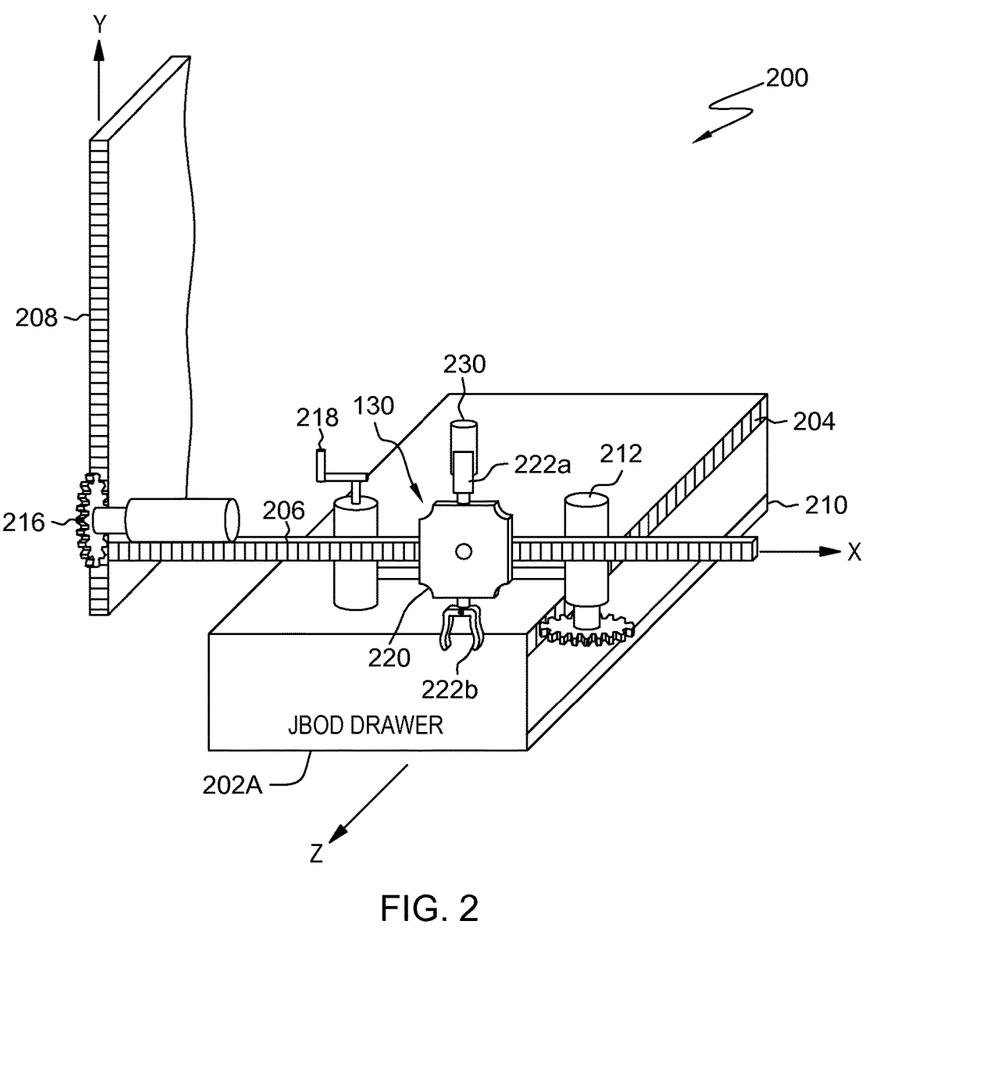
FIG. 2 is a diagram depicting external components of a robotic system, in accordance with an embodiment of the present invention.
Figure 3:
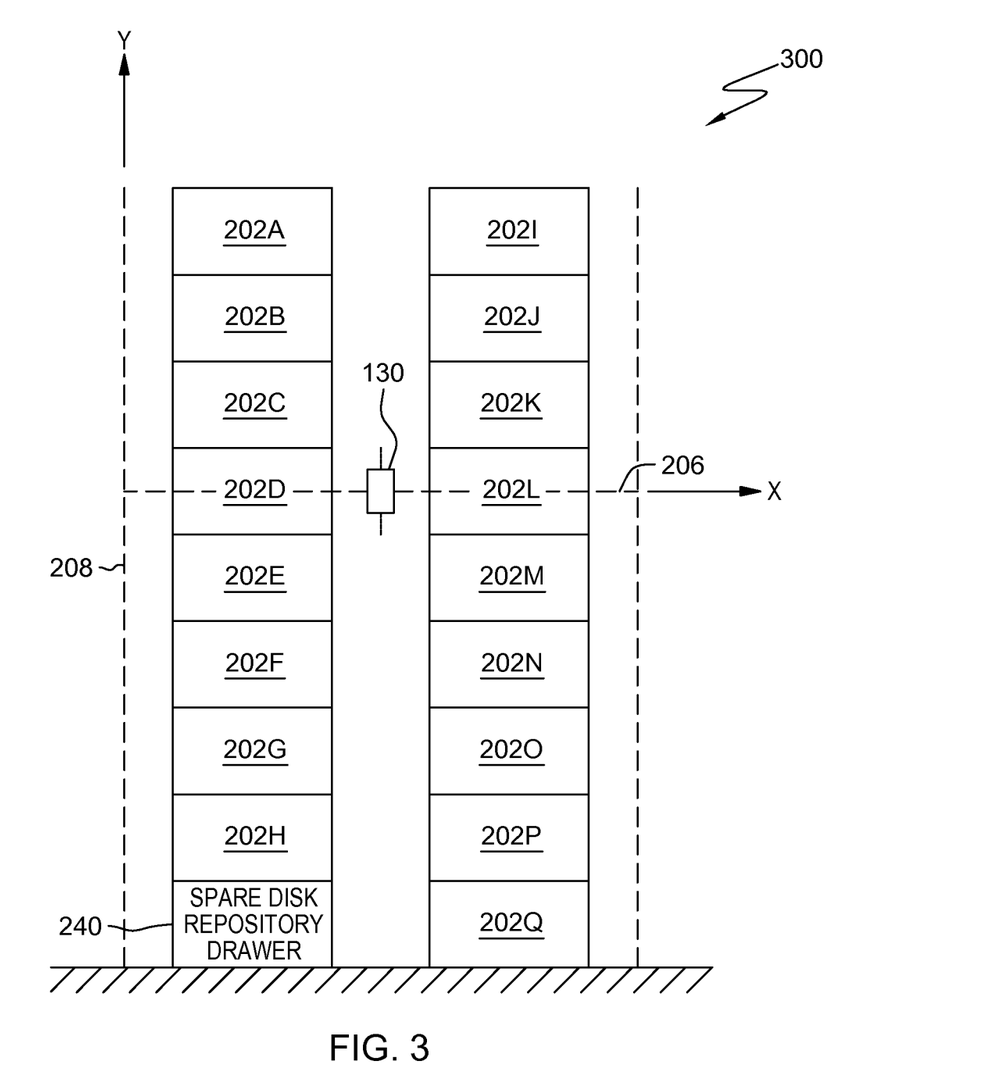
FIG. 3 is a diagram depicting an example perspective view of a rack in which a robotic system can access JBOD drawers, in accordance with an embodiment of the present invention.

In this exemplary embodiment, exchange robot 130 is capable of movement in the x- and y-coordinate directions and capable of removing and inserting HDDs into JBOD drawers in rack system 300 (FIG. 3). Exchange robot 130 is discussed in greater detail with respect to FIG. 2 below. It should be appreciated that the present invention is not limited to the replacement of HDDs and that exchange robot 130 is capable of removing and inserting SDDs into JBOD drawers in rack system 300.

In this exemplary embodiment, exchange robot 130 includes robot controller program 132. In this exemplary embodiment, robot controller program 132 is located on exchange robot 130, however, it should be appreciated that robot controller program 132 may be located remotely at some off-site location. Robot controller program 132 receives a data request from SDS layer 120. Robot controller program 132 controls the movement of exchange robot 130. In this exemplary embodiment, robot controller program 132 is capable of locating HDDs within rack system 300, and instructing exchange robot 130 to obtain new HDDs and to replace defective HDDs. Robot controller program 132 can generally include any software capable of directing exchange robot 130 and communicating with SDS layer 120 via network 110. Robot controller program 132 is a list of instructions to be used by exchange robot 130 for the purposes of locating and replacing HDDs within rack system 300. In this exemplary embodiment, robot controller program 132 processes requests from SDS layer 120. Robot controller program 132 stores the position and status of exchange robot 130 within rack system 300. Exchange robot 130 can interact with one or more JBOD drawers within a rack system as a robotic system.

FIG. 2 is a diagram depicting external components of robotic system 200, in accordance with an embodiment of the present invention. Exchange robot 130 may be implemented with robotic system 200.

In this exemplary embodiment, robotic system 200 is a robot vehicle system comprising exchange robot 130, tracks 206 and 208, and one or more JBOD drawers. Robotic system 200 includes two moving devices 214 (not shown) and 216 which are located on tracks 206 and 208, respectively. Moving device 214 is located within chassis 220 and is not shown in FIG. 2. Robotic system 200 also includes moving device 212. Moving devices 214 and 216 enable movement along the x- and y-axis, respectively. Moving devices 214 and 216 move exchange robot 130 about a rack system. Moving device 212 engages track 204 to move JBOD drawer 202A along the z-axis. In this exemplary embodiment, moving device 212 is coupled to chassis 220. However, it should be appreciated that moving devices 212, 214, and 216 can be located in any position within robotic system 200 capable of allowing exchange robot 130 to move in the x, y, and z directions. In this exemplary embodiment, moving devices 212, 214, and 216 are gear devices connected to a power source (e.g., a battery) and contain a navigation sensor, which provides position data and distance traveled feedback to robot controller program 132 of robotic system 200. In other embodiments, any number of moving devices 212, 214, and 216 may be placed in any location on robotic system 200, which allows movement of exchange robot 130 in a rack system. In this exemplary embodiment, moving devices 212 and 214 are capable of rotating clockwise and counterclockwise around a vertical axis and moving device 216 is capable of rotating clockwise and counterclockwise around a horizontal axis. In other embodiments, one or more of moving devices 212, 214, and 216 may rotate in one or more directions around a vertical or horizontal axis, and may rotate up to 360 degrees around a vertical or horizontal axis.

Exchange robot 130 includes gripper assemblies 222a and 222b connected to chassis 220, push actuator 218, and moving devices 212 and 214 (not shown). Push actuator 218 provides pressure to the front of JBOD drawer 202A to unlock JBOD drawer 202A from a secured closed position. Push actuator 218 provides pressure to the front of JBOD drawer 202A to return it to a secured closed position. In this exemplary embodiment, JBOD Drawer 202A is equipped with push-to-open sliders 210. Push-to-open sliders 210 are located on the bottom of JBOD drawer 202A on both sides (only one shown in FIG. 2). Push-to-open sliders 210 have a built in spring such that after the pressure from push actuator 218 is released, the built in spring forces JBOD drawer 202A to slide out a certain distance. Once JBOD drawer 202A is unlocked, moving device 212 then can drive JBOD drawer 202A in and out along the z-axis. A positioning sensor attached to moving device 212 allows movement of JBOD drawer 202A to different positions for accessing the HDDs inside JBOD drawer 202A.

Exchange robot 130 includes gripper assemblies 222a and 222b. In this exemplary embodiment, gripper assemblies 222a and 222b are identical actuators mounted on opposite sides of chassis 220 and are able to move in two directions along a vertical axis (i.e., extending outward and inward), as well as rotating 360 degrees around the vertical axis at the mount point. It should be appreciated, however, that gripper assemblies 222a and 222b can be mounted at any other suitable location on chassis 220. In this exemplary embodiment, chassis 220 is mounted to track 206 and is capable of rotating 360 degrees about a horizontal axis at the mount point. In other embodiments, exchange robot 130 may include one or more pivoting joints which supports movement of exchange robot 130, each pivoting joint rotating up to 360 degrees in one or more axes. Gripper assembly 222a and 222b is an end effector, or a device coupled to chassis 220 designed to interact with the environment. In this exemplary embodiment, gripper assembly 222a and 222b is an electromechanical gripper device capable of identifying, retrieving, and moving HDD 230. In other embodiments, gripper assembly 222a and 222b may include one or more of: a camera; a barcode scanner; a radio frequency identification (RFID) reader for identifying the requested items; one or more grippers; and a navigation sensor to locate positions within a rack system, mounted to one of the grippers. The exact nature of gripper assembly 222a and 222b is based on different physical effects used to guarantee a stable grasping between a gripper and the object to be grasped, and depends on the application of robotic system 200. In this exemplary embodiment, gripper assembly 222a and 222b each contain two grippers, which are designed to pick up and place HDDs and to work with varying HDD shapes, sizes, and storage systems. In other embodiments, gripper assembly 222a and 222b may be any rapid exchange gripper mechanism technology which supports the retrieval and movement of HDDs, or other tasks in a rack system (e.g., opening storage drawers). For example, gripper assembly 222a and 222b can be impactive (jaws or claws which physically grasp by direct impact upon the object), ingressive (pins, needles, or hackles which physically penetrate the surface of the object), abstrictive (vacuum, magnetic, or electroadhesion forces are applied to the surface of the object), and contigutive (requiring direct contact for adhesion to occur, such as glue, surface tension, or freezing). In this exemplary embodiment, chassis 220 and/or gripper assembly 222a and 222b also contain a navigation sensor (not shown in FIG. 2), which provides position data feedback to robot controller program.

FIG. 3 is a diagram depicting an example perspective view of a rack system 300 in which a robotic system 200 can access JBOD drawers, in accordance with an embodiment of the present invention. In this exemplary embodiment, rack system 300 includes JBOD drawers 202A, 202B, 202C, 202D, 202E, 202F, 202G, 202H, 202I, 202J, 202K, 202L, 202M, 202N, 202O, 202P, 202Q, and spare disk repository drawer 240. Exchange robot 130 is a robot vehicle capable of moving around rack system 300 in the x and y direction, and is capable of removing HDDs from and inserting HDDs in JBOD drawers and spare disk repository drawer 240. Exchange robot 130 is also capable of opening and closing JBOD drawers in the z direction within rack system 300.

Figure 4:
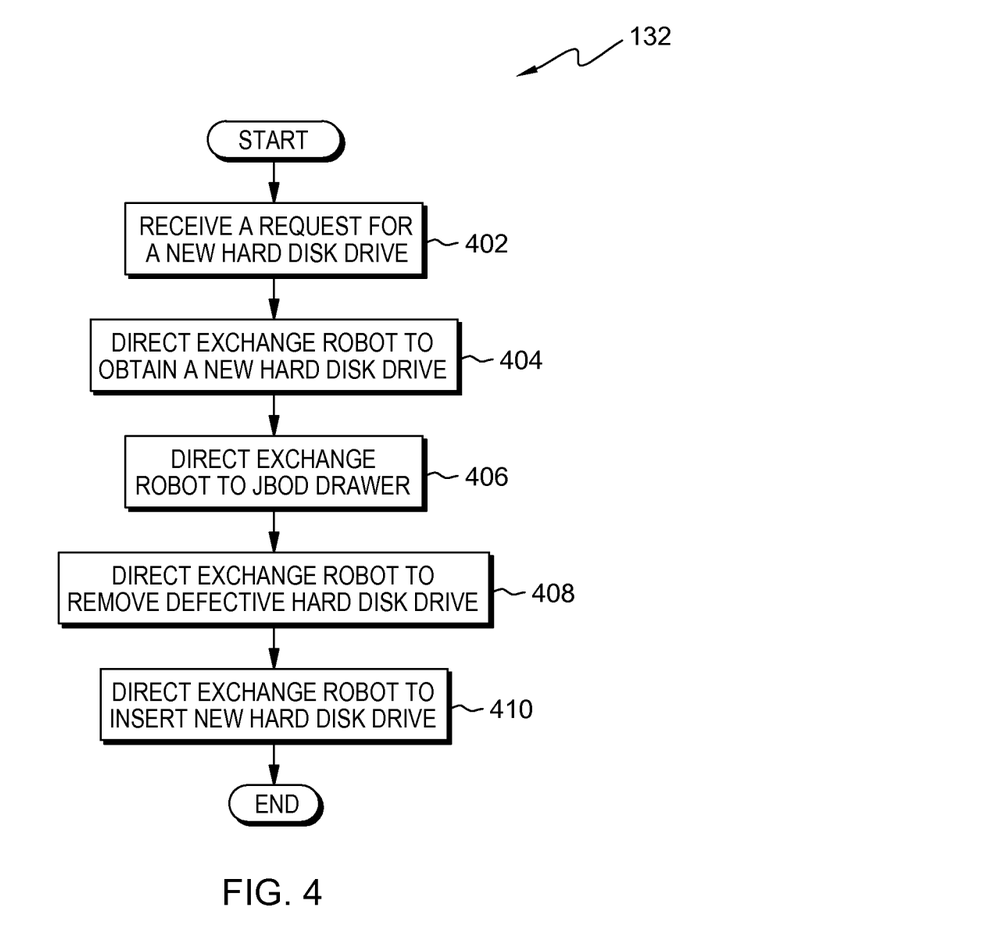
FIG. 4 is a flowchart depicting the operations for fulfilling an automated HDD replacement request, in accordance with an embodiment of the present invention.

FIG. 4 is a flowchart depicting the operations of robot controller program 132, for fulfilling an automated HDD replacement request, in accordance with an embodiment of the present invention. For illustrative purposes, the following discussion is made with respect to JBOD drawer 202A; it being understood that the operations of FIG. 4 may be performed on any of JBOD drawers (e.g., 202A-202Q in FIG. 3).

Robot controller program 132 receives a request for a new HDD (402). In this exemplary embodiment, robot controller program 132 receives a request from SDS layer 120, via network 110, to replace a defective HDD with a new HDD. The request will include information regarding the type and part number of the defective HDD. For example, robot controller program 132 receives a request from SDS layer 120 that an HDD is defective in JBOD drawer 202A. It should be appreciated, however, that the present invention is not limited to replacing defective HDDs, and that a HDD can be replaced for other reasons (e.g., maintenance).

Robot controller program 132 directs exchange robot 130 to obtain a new HDD (404). In this exemplary embodiment, robot controller program 132 directs exchange robot 130 to obtain a new HDD having the same type and part number as the defective HDD. For example, in one embodiment, robot controller program 132 directs exchange robot 130 to spare disk repository drawer 240 to obtain a new HDD that is identical to the defective HDD in JBOD drawer 202A (see FIG. 3).

Robot controller program 132 directs exchange robot 130 to the defective JBOD drawer (406). In this exemplary embodiment, robot controller program 132 directs exchange robot 130 to the JBOD drawer that contains the defective HDD, which is then opened by push actuator 218. Push actuator 218 applies pressure to the front of the JBOD drawer to release it from the secured closed position, which then causes the JBOD drawer to slide out a certain distance. For example, after retrieving a new HDD, exchange robot 130 is directed to JBOD drawer 202A to replace the defective HDD. Exchange robot 130 then opens JBOD drawer 202A via push actuator 218.

Robot controller program 132 directs exchange robot 130 to remove the defective HDD in the JBOD drawer (408). In the exemplary embodiment, robot controller program 132 directs exchange robot 130 to remove the defective HDD from the JBOD drawer using gripper assembly 222b.

Robot controller program 132 directs exchange robot 130 to insert a new HDD in the JBOD drawer (410). In the exemplary embodiment, robot controller program 132 directs exchange robot 130 to rotate 180 degrees about chassis 220 pivot point. Robot controller program 132 then directs exchange robot 130 to insert the new HDD in the JBOD drawer using gripper assembly 222a. Exchange robot 130 can then be directed to dispose of the defective HDD as desired (i.e., place in a defective HDD drawer to be disposed of, place in a drawer to be reformatted or recycled, etc.).

Accordingly, by performing the operations of FIG. 4, a defective HDD can be replaced with an identical new HDD without a service man being present in the storage facility.

Figure 5:
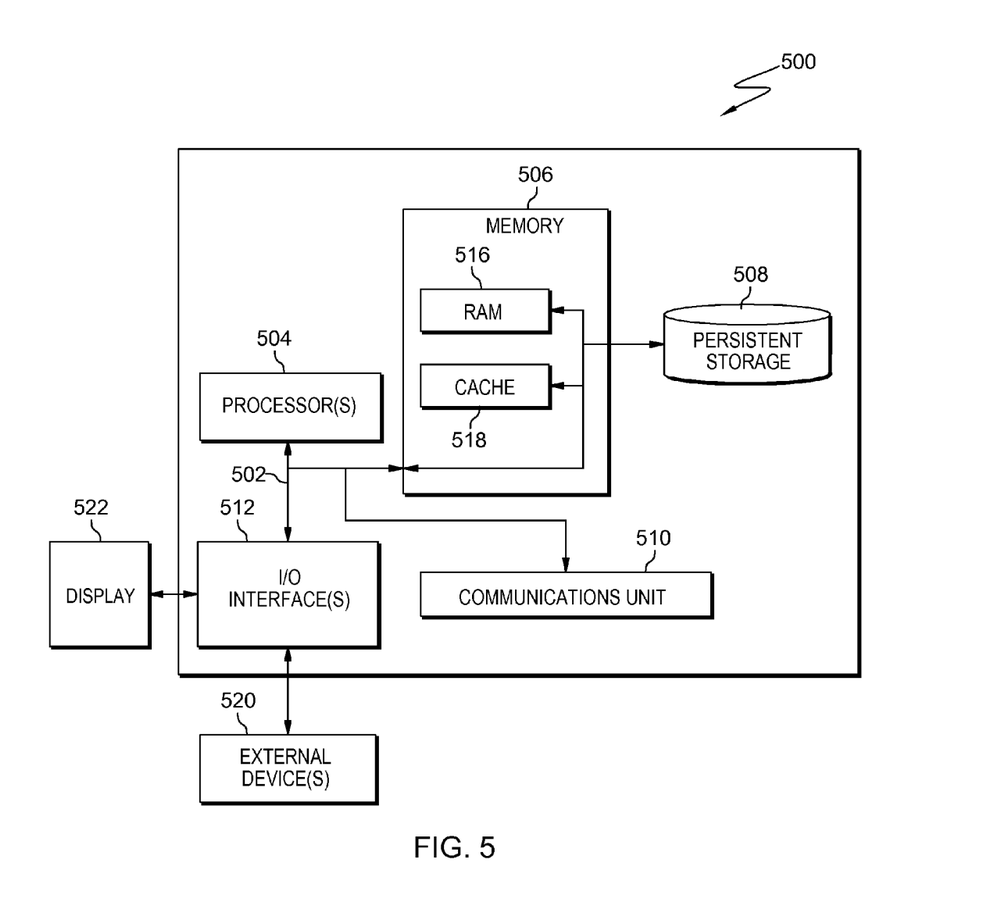
FIG. 5 is a block diagram of internal and external components of a computer system, in accordance with an embodiment of the present invention.

FIG. 5 is a block diagram of internal and external components of computing device 500, which is representative of the computing devices of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 500 includes communications fabric 502, which provides for communications between one or more processing units 504, memory 506, persistent storage 508, communications unit 510, and one or more input/output (I/O) interfaces 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computerreadable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computerreadable storage medium that is also part of persistent storage 508.

Communications unit 510 provides for communications with other computer systems or devices via a network. In this exemplary embodiment, communications unit 510 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 500 through communications unit 510 (i.e., via the Internet, a local area network, or other wide area network). From communications unit 510, the software and data can be loaded onto persistent storage 508.

One or more I/O interfaces 512 allow for input and output of data with other devices that may be connected to computing device 500. For example, I/O interface 512 can provide a connection to one or more external devices 520 such as a keyboard, computer mouse, touch screen, virtual keyboard, touch pad, pointing device, or other human interface devices. External devices 520 can also include portable computerreadable storage media such as, for example, thumb drives, portable optical or magnetic disks, and memory cards. I/O interface 512 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for automatically replacing drives, the method comprising:
   receiving, by one or more computer processors, a request from a software defined storage layer (SDS) for a drive of a plurality of drives in a Just a Bunch of Disks (JBOD) storage system;
   responsive to receiving a request for a drive, identifying, by one or more computer processors, the requested drive from a drive repository and a used drive;
   directing, by one or more computer processors, an exchange robot to obtain the drive from the drive repository;
   directing, by one or more computer processors, the exchange robot to a location of the used drive;
   directing, by one or more computer processors, the exchange robot to remove the used drive from the location;
   directing, by one or more computer processors, the exchange robot to insert the drive into said location of the used drive; and
   disposing the used drive, by one or more computer processors of the exchange robot.

2. The method of claim 1, wherein receiving a request for a new drive comprises:
   receiving, by one or more computer processors, an indication of a defective drive; and
   receiving, by one or more computer processors, identification information of said defective drive, comprising attributes associated with the defective drive.

3. The method of claim 1, wherein said location of a drive is a just a bunch of disks (JBOD) drawer within a drive storage system.

4. The method of claim 1, wherein directing said exchange robot to remove said used drive from said location comprises:
   opening, by said exchange robot, an identified JBOD drawer using an actuator; and
   removing, by said exchange robot, said used drive using a first gripper assembly.

5. The method of claim 4, wherein directing said exchange robot to insert said new drive into said location comprises:
   inserting, by said exchange robot, said new drive into the identified JBOD drawer using a second gripper assembly; and
   closing, by said exchange robot, the identified JBOD drawer using the actuator.

6. The method of claim 1, wherein directing said exchange robot to a location of a used drive comprises:
   moving, by one or more computer processors, said exchange robot along a rail system in an x- and y-direction; and
   directing, by one or more computer processors, said exchange robot to move a JBOD drawer in a z-direction.

7. A computer program product comprising:
   a computer readable storage medium and program instructions stored on the computer readable storage medium, the program instructions comprising:
   program instructions to receive a request from a software defined storage layer (SDS) for a drive of a plurality of drives in a Just a Bunch of Disks (JBOD) storage system;
   responsive to receiving a request for a drive, identifying, by one or more computer processors, the requested drive from a drive repository and a used drive;
   program instructions to direct an exchange robot to obtain the drive from the drive repository;
   program instructions to direct the exchange robot to a location of the used drive;
   program instructions to direct the exchange robot to remove the used drive from the location;
   program instructions to direct the exchange robot to insert the drive into said location of the used drive; and
   program instructions to dispose the used drive.

8. The computer program product of claim 7, wherein the program instructions to receive a request for a new drive comprise:
   program instructions to receive an indication of a defective drive; and
   program instructions to receive identification information of said defective drive, comprising attributes associated with the defective drive.

9. The computer program product of claim 7, wherein said location of a drive is a just a bunch of disks (JBOD) drawer within a drive storage system.

10. The computer program product of claim 7, wherein the program instructions to direct said exchange robot to remove said used drive from said location comprise:
    program instructions to open an identified JBOD drawer using an actuator, and
    program instructions to remove said used drive using a first gripper assembly.

11. The computer program product of claim 10, wherein the program instructions to direct said exchange robot to insert said new drive into said location comprise:
    program instructions to insert said new drive into the identified JBOD drawer using a second gripper assembly; and
    program instructions to close the identified JBOD drawer using the actuator.

12. The computer program product of claim 7, wherein the program instructions to direct said exchange robot to a location of a used drive comprise:
    program instructions to move said exchange robot along a rail system in an x- and y-direction; and program instructions to direct said exchange robot to move a JBOD drawer in a z-direction.

13. A drive storage system comprising:
a server enclosure of a just a bunch of disks (JBOD) system, wherein a first track is coupled to a first surface of the server enclosure;
the first track perpendicularly coupled to a second mounting track, wherein the first track moves in parallel direction to the second track;
a plurality of just a bunch of disks (JBOD), wherein each JBOD includes a plurality of drives stored in respective drawers, wherein each respective drawer includes a push-to-open actuator;
a storage management controller, wherein said storage management controller is configured to manage said plurality of drives; and
a robot system, wherein said robot system is configured to move in an x-, y-, and z-direction, wherein the robot system is coupled to the second track.

14. The drive storage system of claim 13, wherein said robot system comprises:
an exchange robot;
a rail system, wherein said rail system is configured to allow movement of said exchange robot in said x- and y-direction; and
a robot controller program, wherein said robot controller program is operatively coupled to the storage management controller through a network connection.

15. The drive storage system of claim 14, wherein said exchange robot comprises:
a chassis;
one or more gripper assemblies, wherein said one or more gripper assemblies are operatively coupled to said chassis;
a push actuator; and
a plurality of moving devices.

16. The drive storage system of claim 14, wherein said exchange robot is configured to: open a JBOD drawer; move said JBOD drawer in said z-direction; remove a used drive; and insert a new drive.

17. The drive storage system of claim 16, wherein said exchange robot is configured to dispose of said used drive.

18. The drive storage system of claim 13, wherein the drawer comprises:
an enclosure having side walls;
a toothed gear rail attached at to each respective side wall that allows for insertion of a toothed-gear wheel; and
a toothed gear wheel attached to a motor, wherein the toothed gear wheel allows for perpendicular movement of the enclosure to the first track.

* * * * *